Jan. 1, 1963 B. LITT 3,071,526
NUCLEAR FUEL PLATE AND PROCESS FOR MAKING SAME
Filed Aug. 30, 1960 2 Sheets-Sheet 1
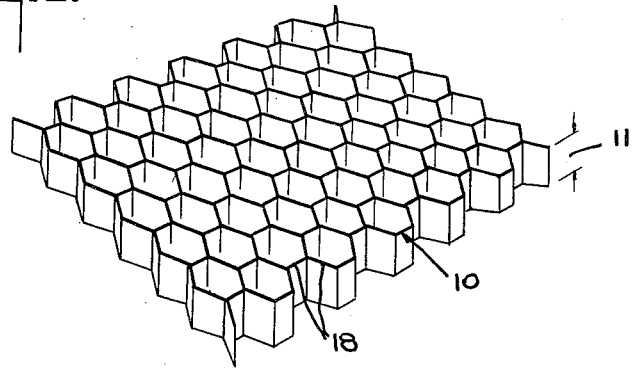
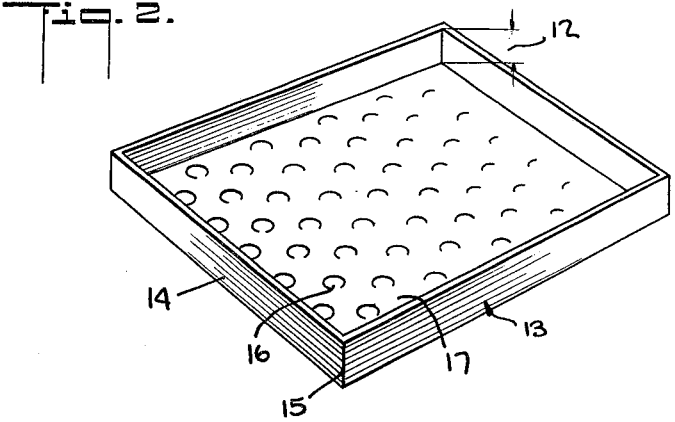
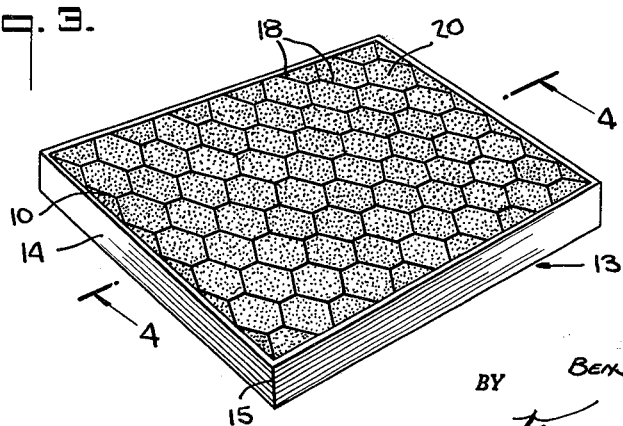
INVENTORS
BY BENJAMIN LITT
Tennyon & Kenyon
ATTORNEYS

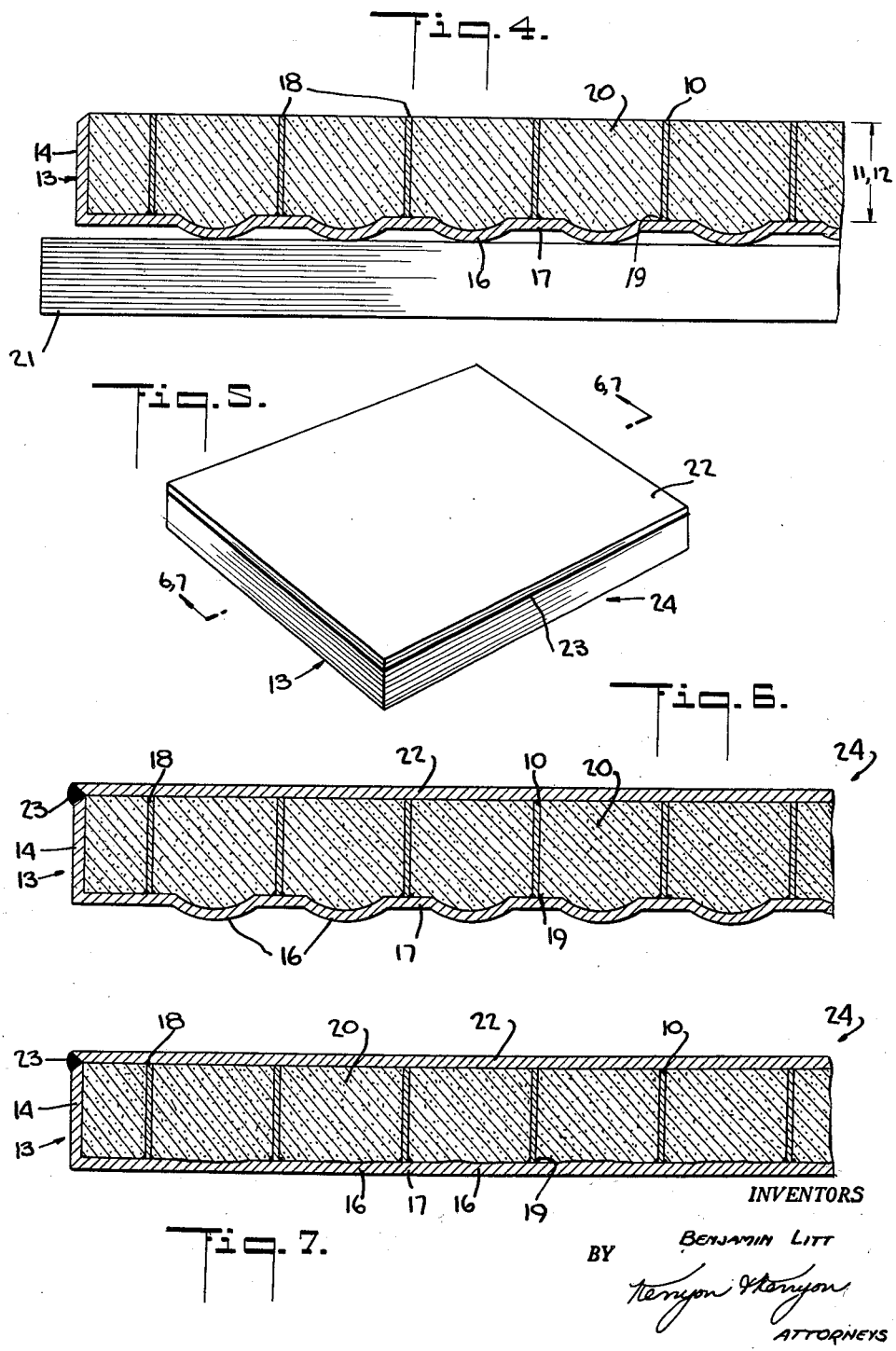

United States Patent Office 3,071,526
Patented Jan. 1, 1963

3,071,526
NUCLEAR FUEL PLATE AND PROCESS
FOR MAKING SAME
Benjamin Litt, Flushing, N.Y., assignor, by mesne assignments, to Sylvania Electric Products Inc., a corporation of Delaware
Filed Aug. 30, 1960, Ser. No. 52,805
6 Claims. (Cl. 204—154.2)

This invention relates to nuclear fuel elements, and more particularly relates to a compartmentalized nuclear fuel plate and the process for making same.

Heretofore, nuclear fuel elements have usually been made in rod form with metallic cladding material for corrosion prevention bonded to the nuclear fuel core by swaging. Disadvantages of this type element appear in the form of poor heat transfer properties due to the geometric shape and to separation caused by fission product gases. High central fuel temperatures result.

Flat plate nuclear fuel elements are highly desirable for their heat transfer advantages, but have been slow in adoption by the art because it is virtually impossible to obtain a metallurgical bond between the nuclear fuel and the cladding material. Separation of the cladding material occurs from the fuel material due to the build-up of fission product gases, and this results in reduction in thermal conductivity, thus preventing high temperature operation.

The art has long sought the heat conducting advantages inherent in flat plates, but has heretofore been prevented from utilizing this advantage due to the aforementioned propensity of the cladding material to be bulged away from the fuel material by fission gases, thus preventing the cladding plate from conducting heat away from the fuel because of the separation of the two. The art has developed no inexpensive solution.

It is therefore an object of this invention to construct a nuclear fuel element of higher thermal conductivity with lower central fuel temperature to allow higher temperature operation.

Another object of the invention is to construct a nuclear fuel element of great rigidity with no separation and little distortion from heat and fission product gases.

Another object of the invention is to construct a flat plate nuclear fuel element less expensively than has heretofore been possible for plates constructed to prevent fission gas buckling.

A still further object of the invention is to construct a flat plate nuclear fuel element in which the combination of great densification of the nuclear fuel with a favorable heat conducting geometric configuration permits greater fuel burnup than heretofore.

Yet another object of the invention is to construct a nuclear fuel element for greater fission product retention. These and further objects will become more apparent as the device and method are hereafter described in greater particularity.

Briefly, the present invention contemplates the fabrication of a nuclear fuel plate having internal metallic compartments which serve to compartmentalize the fuel thus conducting heat away from the hot internal core faster and to hold the cladding material in rigid contact with the fuel so as to prevent undesired fission gas buckling. While the compartmentalization may be of several forms, the preferred is to employ commercially available honeycomb structure. It is also preferred to vibration load the fuel powder into the compartments, and to compact the fuel in the same compaction step that bonds the cladding material to the compartmentalization structure.

In the drawings:

FIG. 1 is a perspective view of the honeycomb structure.

FIG. 2 is a perspective view of the tray which forms the bottom and side cladding for the nuclear fuel, and also illustrates the externally protruding dents in the bottom of the tray which forms one embodiment of the invention.

FIG. 3 is a perspective view of the assembly of FIGS. 1 and 2 with nuclear fuel powder in place.

FIG. 4 is a partial section view taken through FIG. 3 and shows the vibration plate.

FIG. 5 is a perspective view of FIG. 3 with the cover plate added.

FIG. 6 is a partial section view taken through FIG. 5.

FIG. 7 is a partial section view taken through FIG. 5 after hot compressing to shape.

With reference to the drawings, the invention comprises a honeycomb structure 10, as shown in FIG. 1, of suitable material such as stainless steel to be compatible with the nuclear fuel and to metallurgically bond with the nuclear cladding material as hereinafter described. Other compartmentalization configurations may be used, the essential feature being a cellular member extending between the cladding plates. The honeycomb structure 10 is of sufficient transverse dimension 11 to be substantially equal to the inside transverse dimension 12 of the tray 13 shown in FIG. 2. The tray 13 may be formed by turning up the edges of a plate of suitable nuclear cladding material such as stainless steel to form the sides 14 of the tray 13. The sides 14 may be welded or similarly joined together at the joints 15 to form the tray 13. Externally protruding dents 16 may be systematically arranged at points in the bottom 17 of the tray 13 corresponding to the location of the cells of the honeycomb structure 10 when said honeycomb structure 10 is in position in the tray 13. The webs 18 of the honeycomb structure 10 may be brazed to the bottom 17 of the tray 13 at the location 19 shown in FIG. 4.

A suitable nuclear fuel such as uranium dioxide powder 20 is then added to the tray 13 and honeycomb structure 10 in a vacuum or in an inert gas, as shown in FIGS. 3 and 4. The object is to exclude oxygen which may oxidize the uranium dioxide to a less desirable non-stoichiometric form. The uranium dioxide powder 20 is vibration loaded to a minimum density of eighty percent of theoretical maximum density substantially filling the entire interior space of the tray 13, and honeycomb structure 10 to a height substantially equal to the inside transverse dimension 12 of the tray 13 and compartmentalized by the webs 18 of the honeycomb structure 10, all of which are shown in FIG. 4. Vibration may be accomplished by means of a vibration plate 21 as shown in FIG. 4.

After loading, a cover plate 22 of suitable nuclear cladding material such as stainless steel is welded or otherwise metallurgically sealed onto the top of the tray 13 around its periphery 23 in a vacuum or in an inert gas to form a box 24 as shown in FIGS. 5 and 6. The box 24 is then hot compressed to the desired thickness by hot isostatic pressing, hot pressing, hot rolling or by spot welding. Spot welding may be accomplished by applying an electrode at each clad face just over an internal honeycomb section and applying welding current. Hot isostatic pressing for one hour, for example, will form a metallurgical bond of the nature described at conditions at a maximum of 1200° C. and 14,000 p.s.i. The externally protruding dents 16 are flattened as shown in FIG. 7 further densifying the uranium dioxide powder 20, and the webs 18 of the honeycomb structure 10 become metallurgically bonded to the cover plate 22. Thus, a fuel element is obtained that will not bulge when fission gas is produced, and so can operate at higher temperatures and greater efficiency.

The metallurgical bond between the webs 18 of the honeycomb structure 10 and the cover plate 22 along with the compartmentalization of the uranium dioxide powder 20 provides rigidity against the build-up of fission product gases. The close compaction of the uranium dioxide powder 20 and the favorable geometric configuration of the flat plate fuel element permit greater fuel burn-up, burnup being defined as the proportion of the total fuel consumed before the necessity for recharging.

Although the invention has been described with a certain degree of particularity, it is understood that the present disclosure has been made only by way of example and that numerous changes in the details of construction and the combination and arrangement of parts may be resorted to without departing from the spirit and scope of the invention, for example, aluminum may be used instead of stainless steel for the cladding material and any cellular compartmentalizing structure may be employed instead of commercially available honeycomb metal sections. All such variations are contemplated and the only limitations reside in the appended claims.

I claim:

1. The process of making a nuclear fuel plate comprising systematically forming dents in that portion of a plate of nuclear cladding material which is to be the bottom of a tray, said dents externally protruding from the bottom of said tray and corresponding to the cells of a honeycomb structure which is to be placed within said tray, and vibration loading said tray with said honeycomb structure therein with nuclear fuel powder of sufficient quantity to fill the entire interior space of said tray when said honeycomb structure is in position therein to a level substantially equal to the top of said tray after vibration loading, then attaching a cover plate of nuclear cladding material to the top of said tray to form a closed box, and hot compressing said box to metallurgically bond said honeycomb structure to said cover plate and to flatten said dents in the bottom of said tray.

2. The process of making a nuclear fuel plate comprising systematically forming dents in that portion of a plate of nuclear cladding material which is to be the bottom of a tray, said dents externally protruding from the bottom of said tray and corresponding to the cells of a honeycomb structure which is to be placed within said tray, bonding to the bottom of said tray said honeycomb structure which is of sufficient transverse dimension to be substantially level with the top of said tray when in position therein, and vibration loading said tray with said honeycomb structure therein with nuclear fuel powder to a minimum density of eighty percent and of sufficient quantity to fill the entire interior space of said tray when said honeycomb structure is in position therein to a level substantially equal to the top of said tray after vibration loading, attaching a cover plate of nuclear cladding material to the top of said tray to form a closed box, and hot compressing said box to metallurgically bond said honeycomb structure to said cover plate and to flatten said dents in the bottom of said tray.

3. The process of making a nuclear fuel plate comprising systematically forming dents in the bottom of a tray, said dents externally protruding from the bottom of said tray and corresponding to the cells of a honeycomb structure which is to be placed within said tray, vibration loading said tray with said honeycomb structure therein in a vacuum with nuclear fuel powder to a minimum density of eighty percent and of sufficient quantity to fill the entire interior space of said tray when said honeycomb structure is in position therein to a level substantially equal to the top of said tray after vibration loading, attaching a cover plate of nuclear cladding material to the top of said tray in an oxygen free atmosphere to form a closed box, and hot compressing said box to shape to metallurgically bond said honeycomb structure to said cover plate and to flatten said dents in the bottom of said tray.

4. The process of making a nuclear fuel plate comprising systematically forming dents in that portion of a plate of nuclear cladding material which is to be the bottom of a tray, said dents externally protruding from the bottom of said tray and corresponding to the cells of a honeycomb structure which is to be placed within said tray, forming said tray by turning up the edges of said plate and welding them together, bonding to the bottom of said tray, said honeycomb structure which is of sufficient transverse dimension to be substantially level with the top of said tray when in position therein and vibration loading said tray with said honeycomb structure therein in an oxygen free atmosphere with nuclear fuel powder to a minimum density of eighty percent and of sufficient quantity to fill the entire interior space of said tray when said honeycomb structure is in position therein to a level substantially equal to the top of said tray after vibration loading, attaching a cover plate of nuclear cladding material to the top of said tray in an oxygen free atmosphere to form a closed box, and hot compressing said box to metallurgically bond said honeycomb structure to said cover plate and to flatten said dents in the bottom of said tray.

5. A preliminary stage nuclear fuel plate assembly suitable for pressing so as to form a sized parallel faced plate comprising a closed box of nuclear cladding material having opposed transverse cover plates with externally protruding dents in the bottom cover plate thereof corresponding to the cells of a honeycomb structure within, said honeycomb structure having a transverse dimension substantially equal to the inside transverse dimension of said box and metallurgically bonded to said bottom cover plate of said box, said box also containing densified nuclear fuel substantially occupying the entire interior space of said box and compartmentalized by said honeycomb structure.

6. The process of making a nuclear fuel plate comprising systematically forming dents in that portion of a plate of nuclear cladding material which is to be the bottom of a tray, said dents externally protruding from the bottom of said tray and corresponding to the cells of a honeycomb structure which is to be placed within said tray, and loading said tray with said honeycomb structure therein with nuclear fuel powder of sufficient quantity to fill the entire interior space of said tray when said honeycomb structure is in position therein to a level substantially equal to the top of said tray after loading, then attaching a cover plate of nuclear cladding material to the top of said tray to form a closed box, and hot compressing said box to metallurgically bond said honeycomb structure to said cover plate and to flatten said dents in the bottom of said tray.

References Cited in the file of this patent

UNITED STATES PATENTS

| | | |
|---|---|---|
| 2,915,815 | Bean et al. | Dec. 8, 1959 |
| 2,934,482 | Brooks | Apr. 26, 1960 |
| 2,969,312 | Monson | Jan. 24, 1961 |

FOREIGN PATENTS

| | | |
|---|---|---|
| 837,878 | Great Britain | June 15, 1960 |
| 838,324 | Great Britain | June 22, 1960 |

OTHER REFERENCES

Atomic Energy Commission Document TID–7559 (pt. 1), August 1959, pp. 133–155.

"Nuclear Fuel Elements," Hausner and Shumar, Reinhold Publishing Co., New York, pp. 39, 145.